Patented Jan. 30, 1940

2,188,478

UNITED STATES PATENT OFFICE 2,188,478

MODIFIED COAL TAR AND METHOD FOR THE PRODUCTION THEREOF

John Edward Lynn, East Boston, Mass., assignor to Hercules Powder Company, Wilmington, Del., a corporation of Delaware No Drawing. Application June 22, 1938,
Serial No. 215,223

14 Claims. (Cl. 106—32)

This invention relates to a method for improving coal tar and to the product so produced.

One of the disadvantages of coal tar for a great many uses is its tendency to flow excessively when the temperature rises. Because of the cheapness and the inertness of coal tar, however, it is used for many things, such as, for example, roofs, roads, etc., even though it is realized that it has the drawback above mentioned. Various attempts have been made in the past to decrease this tendency to flow with increasing temperature.

It has been customary, for example, to add considerable amounts of other ingredients in the form of fillers, such as, clay, slate flour, and the like, to decrease the tendency to flow as the temperature rises. It has been found, that the addition of a filler increased the viscosity and the softening point of the resultant mixture and caused the assumption to be made that the addition of a filler produced a considerable decrease in the susceptibility to temperature change. Actually, however, the addition of such fillers results in no decrease in the tendency of a coal tar to flow with increasing temperature, but merely increases the softening point of the coal tar which is an undesirable feature. Furthermore, coal tar itself is brittle at low temperature and the addition of the fillers mentioned increases rather than decreases the brittleness of the final product.

Now, I have found that I may obviate the disadvantages above cited and produce a modified coal tar which shows a surprising improvement in the resistance of the coal tar to flow when the temperature increases and which has a superior flexibility and improved adhesion at lower temperatures. More particularly, I have found that these improved qualities may be imparted to a refined coal tar by the addition thereto of gasoline-insoluble resin derived from pine wood, together with small amounts of aluminum chloride. Instead of the aluminum chloride alone, I may use combinations thereof with basic metal hydroxides or oxides, among which are, for example, sodium hydroxide, magnesium oxide, potassium hydroxide, calcium hydroxide, zinc oxide, etc., and of these I prefer using sodium hydroxide and calcium hydroxide. In the latter case the amount of aluminum chloride used in modifying the tar may be reduced.

The gasoline-insoluble pine wood resin I employ for the preparation of my improved modified coal tar may be produced, for example, by extracting resinous wood with a coal tar hydrocarbon, removing said hydrocarbon by evaporation, leaving a residue comprising a mixture of wood rosin and the new resin, extracting wood rosin from the said residue by a petroleum hydrocarbon, and leaving the new gasoline-insoluble pine wood resin, as is described and claimed in application, Serial No. 61,745, filed January 31, 1936 by Lucius C. Hall.

The aluminum chloride which I employ for the preparation of my improved modified coal tar is preferably in an anhydrous condition. It is well known that aluminum chloride hydrate ($AlCl_3 \cdot 6H_2O$) has the solubility characteristics of an inorganic salt and is unaffected by typical organic solvents, such as ether, carbon tetrachloride, etc. I have found that the use of this completely hydrated aluminum chloride in the modification of coal tar in accordance with the method herein described, does not produce any significant improvement over an unmodified coal tar of like softening point. However, if the aluminum chloride used, although originally anhydrous, has absorbed a small amount of water, it will still be reactive in my process, although the reactive fraction will only be the anhydrous material still present; the hydrated part acting merely as an inert filler. Therefore, it is to be understood, that where I refer to aluminum chloride in the specification and claims, I mean a product substantially in an anhydrous condition.

The coal tar which I use as a starting material for producing my improved product is a refined coal tar which is a viscous fluid at room temperature and which loses about 10% to 20% of its volatile matter when heated to raise the softening point to about 130° F.

I have found that the rate of change of the viscosity characteristic of my improved modified coal tar with temperature is considerably less than that of an unmodified tar, resulting in a better flexibility at low temperatures, promoting better adhesion at such temperatures, and reducing the flow as the temperature increases.

Although the complexity of the reactants which go with my improved composition has made it impossible for me to determine its chemical composition, I attribute its improved properties to a unique colloidal structure not possessed by the modified coal tars heretofore produced.

The following data, for example, indicate that the volatile loss at 325° F. of my modified and an unmodified coal tar control is somewhat greater for the former, as shown below. While the difference is not great, it is sufficient to indicate that my modified coal tar evidently possesses a unique structure in order to show equally high softening points and at the same time more volatile matter than the unmodified tars.

TABLE I

Volatility at 325° F. (A. S. T. M. Method D6-33)

| Treatment | Softening point °F. | Percent volatile |
|---|---|---|
| Unmodified | 127 | 1.5 |
| Do | 130 | 1.5 |
| Modified | 132 | 2.8 |

In proceeding in accordance with my invention I may take a refined coal tar and add thereto from about 2% to about 30%, preferably from about 2% to about 7% of the weight of the refined coal tar, of gasoline-insoluble resin derived from pine wood together with a small amount of aluminum chloride or mixtures thereof with basic metal oxides or hydroxides and heat this mixture to about 400° F. to 450° F., while stirring continuously. The mixture is cooked at this temperature until a droplet of the mixture cooled on a plate, softens in approximately the same time, when the plate is gently heated, as an adjacent droplet of an unmodified coal tar control having the softening point desired. Heating of the mixture at a temperature around 400° F. to 450° F. should be minimized to as great an extent as possible, because of the volatilization of aluminum chloride. Prior to heating, I prefer to make dispersions of both gasoline-insoluble resin derived from pine wood and the aluminum chloride or of aluminum chloride in combination with basic metal oxides or hydroxides, separately in the refined coal tar and then combine these two and cook the mixture to the desired softening point. I have found that I obtain more intimate admixture of the various reactants when proceeding in this manner, although it is to be understood, of course, that other ways of combining the ingredients prior to cooking are not precluded. For example, gasoline-insoluble resin derived from pine wood and aluminum chloride may be ground together and added to the refined coal tar and the mixture then heated.

I have found that it is necessary for gasoline-insoluble resin derived from pine wood and the aluminum chloride to be reacted together in the presence of the refined coal tar containing the volatile components in order to produce a modified coal tar having the properties of reduced flow at elevated temperatures as well as better flexibility and adhesion at low temperatures. If gasoline-insoluble resin derived from pine wood is dispersed in one-half the refined coal tar and the aluminum chloride in the other half, and the separate halves then cooked to approximately the desired softening point before combining the two products, I find that there is little or no improvement over a modified coal tar with a similar softening point.

The amount of aluminum chloride or mixtures thereof with the compounds, before mentioned, which are added to the tar depends on the characteristics of the tar and the particular combination of compounds used. Whether using aluminum chloride alone or various combinations thereof, as before given, I have found that the total amount, based on the weight of the coal tar should be from about 0.5% to about 5.0%, preferably about 1% by weight. I have found, for example, that the amounts of the compounds shown in the following table give very satisfactory products when used in conjunction with about 2%–30%, preferably with about 2–7% by weight of coal tar of gasoline-insoluble resin derived from pine wood, before shown.

TABLE II

| | Per cent |
|---|---|
| Aluminum chloride alone | about 1 |
| Aluminum chloride | 0.94 |
| Sodium hydroxide | 0.05 |
| Aluminum chloride | 0.36 |
| Calcium hydroxide | 0.11 |

In the general procedure outlined above and in the examples which follow below, the starting material for both the unmodified and modified samples is a refined coal tar which is a viscous fluid at room temperature. For general service work, a coal tar is desired having a softening point in the range of about 120° F. to 140° F. In following the procedure in accordance with this invention modified coal tars are produced having a softening point within this range. In order to have a fair comparison between a modified coal tar and an unmodified coal tar, it is necessary to use tars of substantially the same softening point. The unmodified coal tar control samples are, therefore, made by subjecting the refined coal tar to a similar cooking treatment in order to drive off the volatile components and raise the softening point to a point within the above specified range. All comparisons shown in the following examples are thus always made between modified coal tars and unmodified coal tar controls having substantially the same softening point.

Having described my invention in a general way I will now proceed to a more detailed description thereof by reference to the following examples. All parts shown in these examples are parts by weight.

*Example I*

To 94 parts of refined coal tar there were added 6 parts of gasoline-insoluble resin derived from pine wood. This mixture was then heated to 212° F. and, while stirring, 0.1 part of sodium hydroxide was added and the temperature raised to 300° F. At this point 1.9 parts of aluminum chloride were slowly added while stirring the mixture and the temperature was raised to about 425° F.–475° F., and held there for 20 minutes, after which the mass was allowed to cool. The softening point of this modified coal tar by the ring and ball method was 134.4° F.

A sample of the above modified coal tar when subjected to the Barrett slide test as described in Industrial and Engineering Chemistry 10, 735 (1918), a test well known to the art, showed that my modified coal tar flowed 4⅝ inches in two hours at a temperature of 140° F. A sample of the unmodified coal tar control, with the same softening point, (134.6° F.), run simultaneously, flowed 6⅝ inches in 50 minutes. In the same time that the unmodified coal tar flowed 6⅝ inches, the above modified coal tar flowed only 3 inches, or less than ½ as much. It is apparent from these data that there is a marked improvement in the susceptibility of the coal tar to flow at elevated temperatures on inclined surfaces when modified in accordance with my method.

*Example II*

Six parts of gasoline-insoluble resin derived from pine wood were added to 194 parts of refined coal tar, and this mixture then heated to 300° F. While stirring this, 2 parts of aluminum chloride were slowly added, the temperature then raised to about 425° F. to 475° F., and held there for 20 minutes after which the mass was allowed to cool. The softening point of this modified coal tar by the ring and ball method was 131.7° F.

A sample of the above modified coal tar when subjected to the Barrett slide test at 140° F., flowed 5⅜ inches in 2 hours. The unmodified coal tar control with a softening point of 134.6° F. run simultaneously, flowed 6⅝ inches, in 50 minutes. In the same period, that is 50 minutes, the modified coal tar flowed only about 3¾ inches or slightly more than ½ as much as the unmodified tar. The marked improvement shown by my modified coal tar is again quite apparent. In this case it should also be noted that greatly improved resistance to flow is attained with my modified coal tar even though its softening point is slightly lower than the original tar, which is contrary to what would be expected.

*Example III*

Thirty-six parts of gasoline-insoluble resin derived from pine wood were incorporated in 600 parts of a refined coal tar by raising the temperature sufficiently to melt the resin. Twelve parts of aluminum chloride were then dissolved separately in 600 parts of the same tar by warming the latter slightly. These two separately prepared components were then combined and cooked at a temperature of 400° F.–450° F. for about 20 minutes, producing a modified coal tar having a softening point of 126.5° F.

A sample of this modified coal tar when subjected to the Barrett Slide Test in the same manner as indicated before flowed 6⅝ inches in 17 minutes. An unmodified coal tar control sample with a softening point of 127° F. flowed the same amount under the same conditions in 12 minutes.

In order to illustrate the better "cold flow" of my improved modified coal tar, a sample of the modified tar as prepared in Example I above and an unmodified coal tar control of about the same softening point were subjected to a penetration test, using a penetrometer and standard needle as described in A. S. T. M. Standard Test Method D5—25. Penetration is expressed as the distance that a standard needle vertically penetrates a sample of the material under known conditions of loading and is a measure of the consistency of the bituminous material. In the present case the load was 100 grams applied over a relatively long period of time in order to increase the accuracy of the test. The readings obtained were then calculated to the penetration occurring in five seconds which is the standard time interval, and are noted in hundredths of a centimeter.

At 32° F. I found that the needle penetrated the unmodified coal tar control to a depth of 0.03 of a centimeter. At the same temperature, the penetration of the needle into the coal tar modified as in Example I above was 0.09 of a centimeter. In other words, the penetration of the needle into the modified tar was three times as great. This indicates that the coal tar modified in accordance with this invention is much more fluid at this low temperature than the unmodified control sample.

It is apparent therefore, that coal tar modified in accordance with this invention retains its flexibility better at low temperatures than an unmodified tar of substantially the same softening point. The fact that the modified tar flows less than the unmodified tar at elevated temperatures has already been shown. Thus it is seen that not only does my improved modified coal tar flow less at elevated temperatures but it retains its flexibility better at low temperatures, both being important advantages in the various practical applications of coal tar and which have not been obtained by prior art modified coal tars.

It will be understood that the examples above given are by way of illustration only, and that the scope of my invention is not to be limited thereto.

What I claim and desire to protect by Letters Patent is:

1. An improved modified coal tar comprising a refined coal tar modified with gasoline-insoluble resin derived from pine wood and a minor amount of aluminum chloride.

2. An improved modified coal tar comprising a refined coal tar modified with gasoline-insoluble resin derived from pine wood and a minor amount of aluminum chloride and a compound selected from the group consisting of basic metal oxides and basic metal hydroxides.

3. An improved modified coal tar comprising a refined coal tar modified with gasoline-insoluble resin derived from pine wood and a minor amount of aluminum chloride and sodium hydroxide.

4. An improved modified coal tar comprising a refined coal tar modified with gasoline-insoluble resin derived from pine wood and a minor amount of aluminum chloride and calcium hydroxide.

5. An improved modified coal tar comprising a refined coal tar modified with about 2% to about 30% by weight of said coal tar of gasoline-insoluble resin derived from pine wood and with about 0.5 to about 5% by weight of the coal tar of aluminum chloride.

6. An improved modified coal tar comprising a refined coal tar modified with about 2% to about 7% by weight of the said coal tar of gasoline-insoluble resin derived from pine wood and with about 1% by weight of said coal tar of aluminum chloride.

7. An improved modified coal tar comprising a refined coal tar modified with about 2% to about 7% by weight of the said coal tar of gasoline-insoluble resin derived from pine wood and with about 1% by weight of said coal tar of a combination of aluminum chloride and a compound selected from the group consisting of basic metal oxides and basic metal hydroxides.

8. The method of making an improved coal tar which comprises simultaneously heating together gasoline-insoluble resin derived from pine wood and a refined coal tar in the presence of aluminum chloride.

9. The method of making an improved coal tar which comprises simultaneously heating together a refined coal tar, gasoline-insoluble resin derived from pine wood and aluminum chloride and a compound selected from the group consisting of basic metal oxides and basic metal hydroxides.

10. The method of making an improved coal tar which comprises simultaneously heating together a refined coal tar, gasoline-insoluble resin derived from pine wood and aluminum chloride and sodium hydroxide.

11. The method of making an improved coal tar which comprises simultaneously heating together a refined coal tar, gasoline-insoluble resin derived from pine wood and aluminum chloride and calcium hydroxide.

12. The method of making an improved coal tar which comprises simultaneously heating together a refined coal tar, about 2% to about 30% by weight of refined coal tar of gasoline-insoluble resin derived from pine wood and about 0.5% to about 5% by weight of the said coal tar of aluminum chloride.

13. The method of making an improved coal tar which comprises simultaneously heating together a refined coal tar, about 2% to about 7% by weight of refined coal tar of gasoline-insoluble resin derived from pine wood and about 1% of the weight of said coal tar of aluminum chloride.

14. The method of making an improved coal tar which comprises simultaneously heating together a refined coal tar, about 2% to about 7% of the weight of refined coal tar of gasoline insoluble resin derived from pine wood and about 1% of the weight of said coal tar of aluminum chloride, and a compound selected from the group consisting of basic metal oxides and basic metal hydroxides.

J. EDWARD LYNN.